United States Patent [19]
Nelson

[11] 3,795,063
[45] Mar. 5, 1974

[54] CARD SELECTION SYSTEM
[75] Inventor: Roy A. Nelson, Acton, Mass.
[73] Assignee: Spellbinder, Inc., Boston, Mass.
[22] Filed: Feb. 28, 1973
[21] Appl. No.: 336,751

[52] U.S. Cl. .................................. 35/35 D, 35/9 D
[51] Int. Cl. .............................................. G09b 5/02
[58] Field of Search ............ 35/35 D, 9 R, 9 D, 9 B

[56] References Cited
UNITED STATES PATENTS

| | | | |
|---|---|---|---|
| 1,629,635 | 5/1927 | Parsons | 35/9 R |
| 2,505,230 | 4/1950 | Composto | 35/35 D |
| 2,838,847 | 6/1958 | Zalkind | 35/35 D X |
| 3,067,524 | 12/1962 | Parker | 35/9 D |
| 3,122,843 | 3/1964 | Levine et al. | 35/9 D |
| 3,314,165 | 4/1967 | Shreck et al. | 35/35 D X |
| 3,659,356 | 5/1972 | Nelson | 35/35 D |

Primary Examiner—Wm. H. Grieb

[57] ABSTRACT

A card selection system comprises a control card and an element card, each having visible indicia, one card having a coded array of apertures and the other having a coded array of cooperating protrusions. The one card is received in a base with its coded array of apertures aligned with a plurality of resilient electrical contacts and receives the other card with its coded array of protrusions directed toward the contacts; the protrusions move certain of the contacts with respect to conducting means on the base, and the apertures cooperate to permit motion of those contacts with respect to the conducting means. An electric current is thereby conditioned through the conducting means to indicate the selection of an element card having an array coincidently coded with a control card coded array.

7 Claims, 4 Drawing Figures

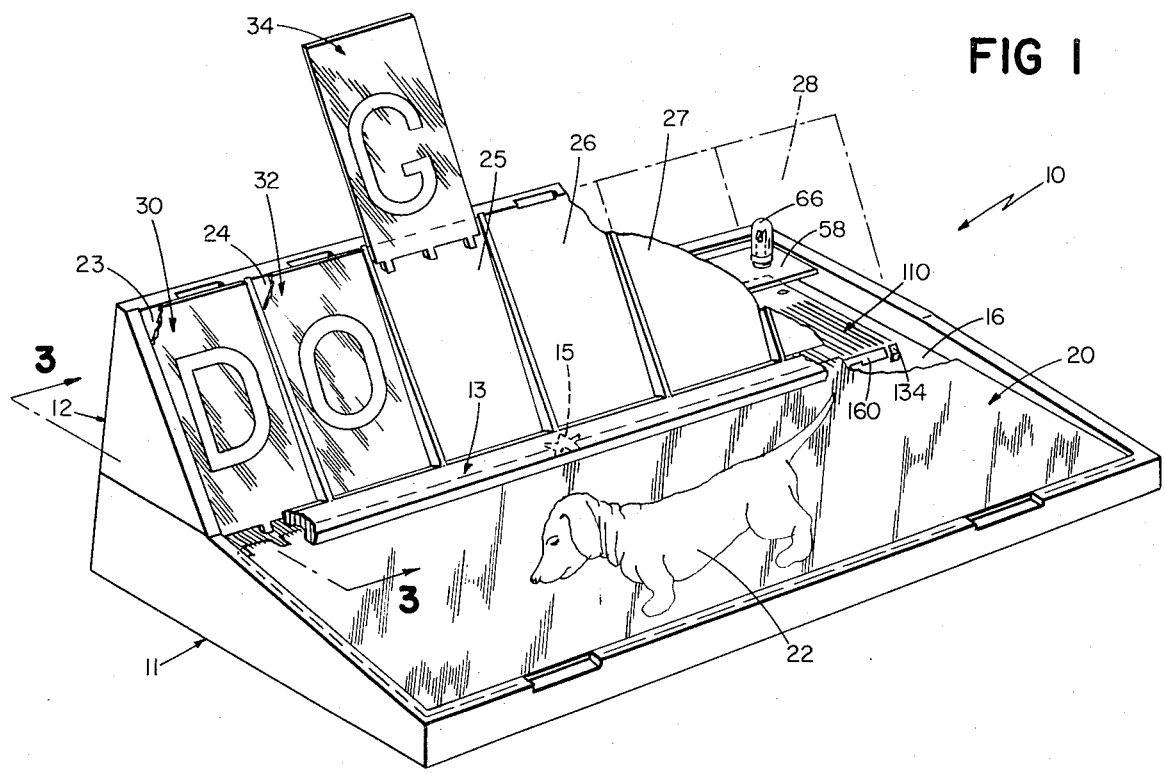

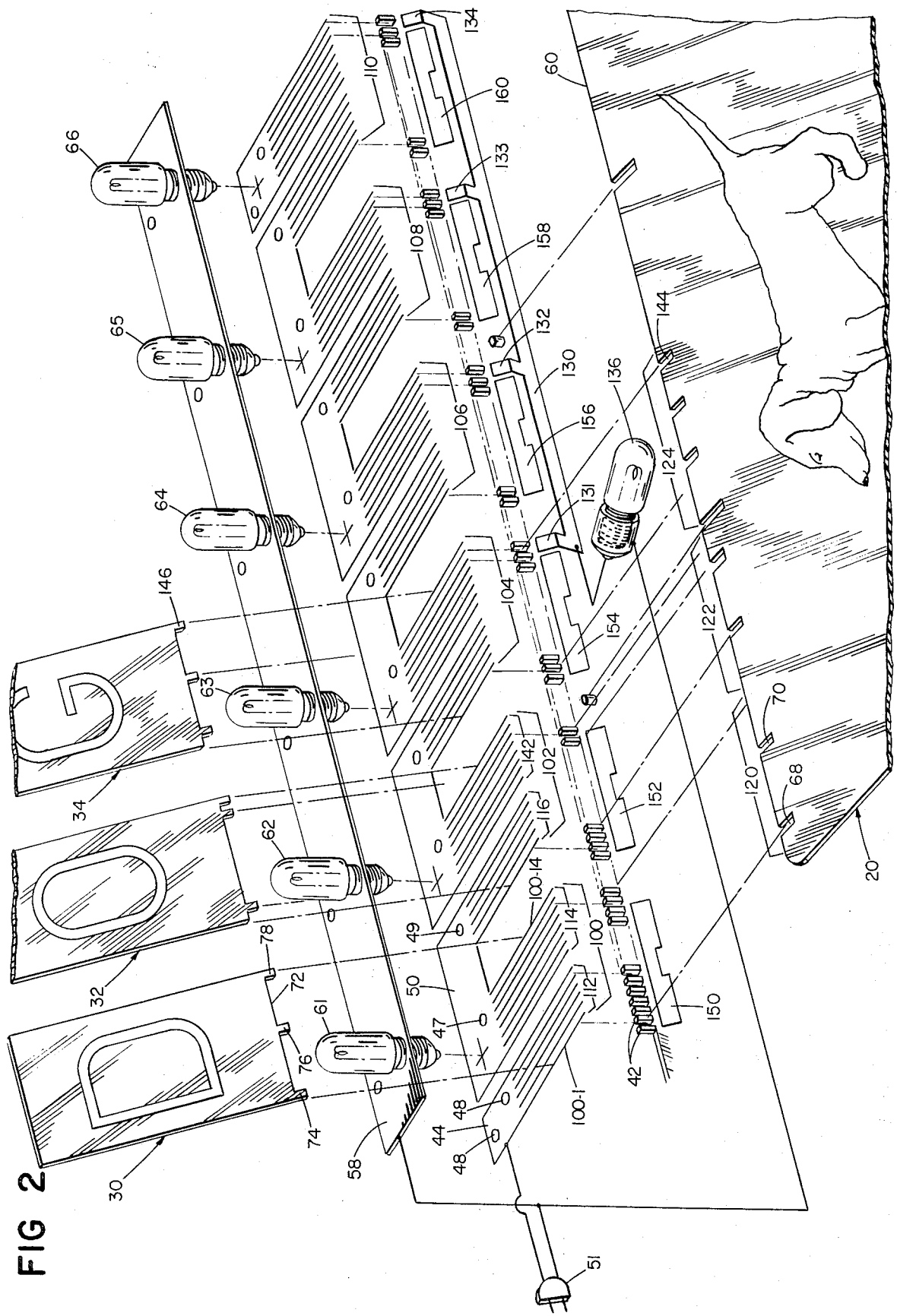

CARD SELECTION SYSTEM

This invention relates to an educational device for teaching spelling and reading. In particular, this invention aids in such teaching by providing a reward for the correct selection of each letter in the sequence of letters that spell a designated word, with a further reward for completing the word. It is an improvement over the device of my U.S. Pat. No. 3,659,356.

This device provides an opportunity for a student to work individually, without supervision, and at his own pace. The device provides preformed letters for use by children too young to have the manual dexterity to form letters accurately, but able to learn to spell and read simple words. It supplies a variety of new tasks, and reinforces acquired knowledge by rewarding success in repeating the spelling of known words. The invention provides immediate encouragement at each successfully completed stage of the task, and immediate indication of which portion of the attempted solution is in error. In addition, the device has inexhaustible patience, will reward successes as often as they are achieved, and will wait as long as the student requires for each step to be completed.

The logical decisions involved in the operation of the device are mechanically determined by the removable portions of the device, which contain no electrical or conducting elements. Therefore these portions are cheaply and simply manufactured of a single material; in addition, all electrical parts of the device are kept out of reach of the user. A minimum of mechanical moving parts are involved in the operation, so that the device will continue to work reliably over prolonged periods of use. Although the logical decisions are determined by the mechanical structure of the removable portions, all such removable portions, representing both correct and incorrect decisions, are physically accommodated by the device. Thus information about the correctness of choice is not provided by mechanical fit or misfit.

The coded portions of the control and element cards, which are the portions that must be mechanically matched, are hidden from the user while the system determines the correctness of the choice of element card, thus discouraging the user from learning to match similar structure instead of learning to spell words.

The card selection system of the invention comprises a base having conducting means and a plurality of resilient electrical contacts, movably positioned and biased with respect to the conducting means. The system further comprises a control card and an element card, each having visible indicia, one card having a coded array of apertures and the other having a coded array of cooperating protrusions. The base receives the one card with its coded array of apertures aligned with the contacts and receives the other card with its coded array of protrusions directed toward the contacts; the protrusions move certain of the contacts with respect to the conducting means, and the apertures cooperate to permit motion of those contacts with respect to the conducting means. An electric current is thereby conditioned through the conducting means to indicate the selection of an element card having an array coincidently coded with a control card coded array. The element and control card visible indicia are spaced from one other while the cards are received in the base, for simultaneous display of the indicia.

In preferred embodiments, the conducting means comprises a plurality of conductors, and the plurality of resilient electrical contacts are disposed in a sequence of contact arrays, each corresponding with a conductor. The contacts are biased away from the conductors. The control card has a sequence of coded arrays of apertures for selection of a sequence of coded element cards each having a coded array of protrusions, the control card being received in the base with its sequence of coded arrays corresponding with the sequence of contact arrays.

Each contact array comprises two groups of connected contacts, the two groups being insulated from each other, and each contact array is connected to the next contact array in the sequence. The protrusions of a coincidently coded element card direct at least one resilient contact within each group of a contact array toward the corresponding conductor, and the apertures of the control card permit that one contact within each group to engage the corresponding conductor, for transmission of a current from one group to the other.

The base provides contact spacing means for substantially preventing motion of the contacts parallel to the conductors while permitting flexion of the contacts to and from the conductors.

The sequence of contact arrays includes two initial contact arrays and further contact arrays, and the conducting means further includes a bus, corresponding to the further contact arrays, the bus being insulated from the conductors; the contacts are biased away from the bus, one of the contacts in each further contact array being disposed for engagement with the bus. Each element card protrusion array provides a protrusion directing that one contact toward the bus.

The control card sequence includes at least three coded aperture arrays for determining the selection of a sequence of at least three coincidently coded element cards, one of the coded aperture arrays being a final aperture array and providing an aperture permitting the one contact in the corresponding contact array to engage the bus. The signal indicating means includes means connected to the bus and responsive to the selection of a completed sequence of element cards each coincidently coded with a control card aperture array including the final aperture array.

Other objects, features and advantages will appear from the following description of a preferred embodiment of the invention, taken together with the attached drawings thereof, in which:

FIG. 1 is an overall view of the card selection system of the invention, partially broken away to show the contacts;

FIG. 2 is an exploded view of the electrical portions of the system with control and element cards;

FIG. 3 is a section taken on line 3—3 of FIG. 1; and

Figure 4:
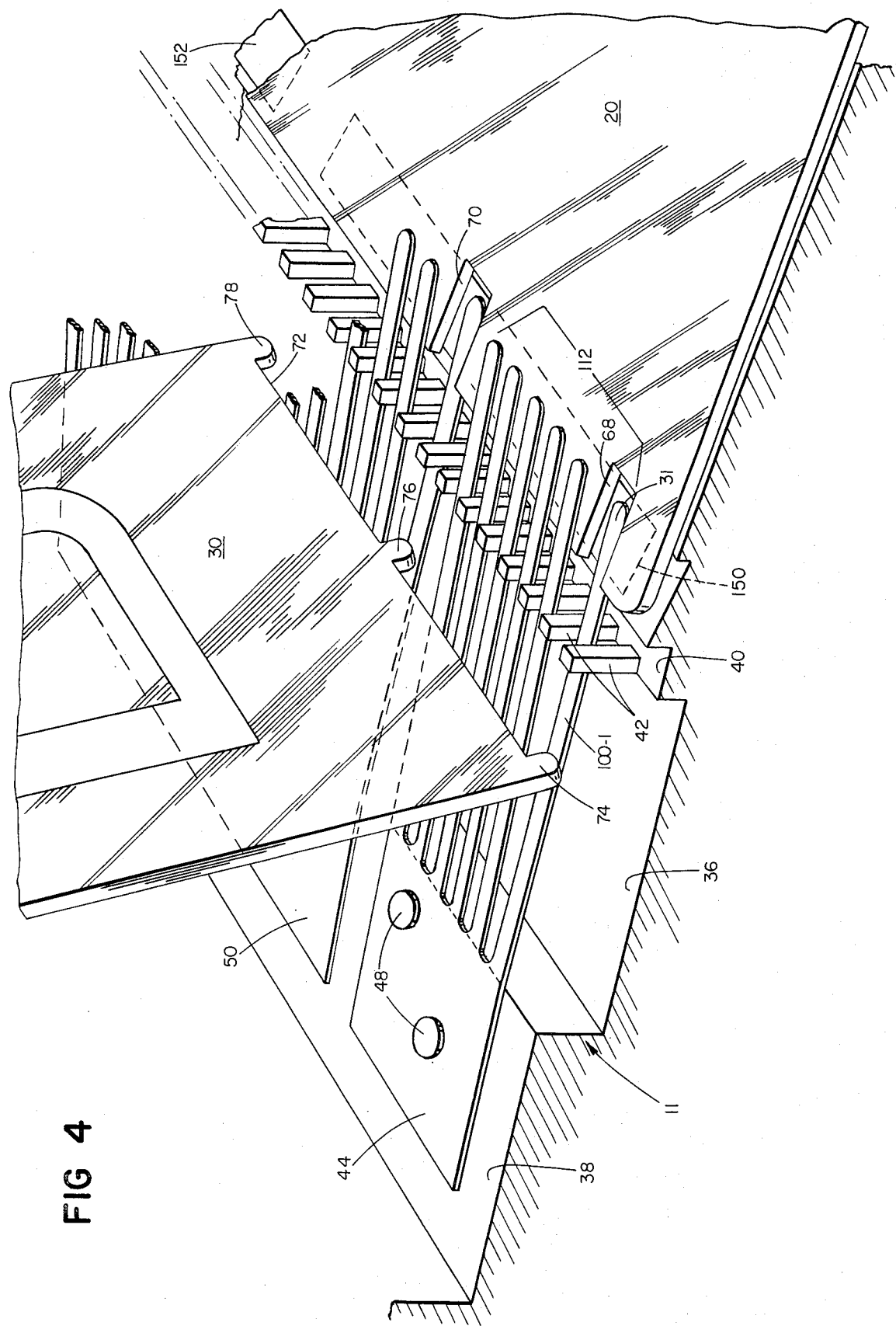
FIG. 4 is a detail view of one portion of the system in operation.

Referring to the drawings, the card selection system of the invention comprises a control card 20, a set of element cards such as those shown at 30, 32 and 34, and a housing generally designated at 10. Housing 10 is molded of a suitable plastic and includes a base portion 11, a bridge 13, and a top portion 12. Base portion 11 provides a slanted front panel 16, for receiving a control card 20, bearing visible indicia such as the picture of a dog 22. Top portion 12 provides six slanted letter display slots 23, 24, 25, 26, 27 and 28 for receiving up to six element cards such as cards 30, 32 and 34, each bearing visible indicia such as the letters D,O,G, shown. The letter display slots and element cards are translucent.

Base portion 11 of housing 10 further provides, beneath top portion 12, a horizontal recess portion 36, extending the width of base 11, and bordered by front and back shelf portions 40 and 38. Front panel 16 meets front shelf portion 40, which provides a plurality of closely spaced teeth 42 integrally molded with shelf portion 40.

Housing 10 further provides a plurality of resilient electrical contacts disposed in six contact arrays 100, 102, 104, 106, 108 and 110. Each contact array comprises fourteen contacts, disposed in two groups of six and eight, the two groups being electrically separated from one another. Thus array 100 of contacts 100-1 through 100-14 is divided into groups 112 and 114 of six and eight contacts respectively. All the contacts in group 112 are connected together through flat portion 44, secured to back shelf portion by staking at 48. Group 114 of eight contacts is connected to group 116 of six contacts in the next array 102 by connecting flat portion 50, secured to back shelf portion 38 by staking at 47 and 49. Each contact array corresponds in location to a letter display slot in top portion 12. The initial group 112 of six contacts is connected to plug 51, to which a source of electrical current may be connected.

Housing base portion 11 further provides six conductors 150, 152, 154, 156, 158 and 160, disposed along the upper edge of front panel 16 adjacent front shelf portion 40 and secured to the front panel with a suitable adhesive. Each conductor corresponds in location to a letter display slot and a contact array. Thus first conductor 150 corresponds to slot 23 and contact array 100. The resilient contacts in each array extend toward front panel 16, across recess portion 36 and between teeth 42. Bridge 13 lies above teeth 42 and cooperates with them to prevent the contacts from being moved in any direction except to and from the corresponding conductor.

The ends 31 of the contacts overlie the conductors, with the exception of the last contact 100-14 in array 100, and similarly the fourteenth contact in each of the other arrays. A bus 130 is secured to housing base 11 and provides four tabs 131, 132, 133 and 134. Tab 131 lies adjacent to one end of third conductor 154, in a position to engage contact 104-14 Tabs 132, 133 and 134 are similarly placed to engage the fourteenth contact in each of arrays 106, 108 and 110 respectively. The fourteenth contact in the two first arrays 100 and 102 does not engage either a conductor or bus 130; this design is intended for the spelling of words of three or more letters, but could clearly be modified as desired. A word lamp 136 is connected to bus 130 and to plug 51. Word lamp 136 is located behind bridge 13 of housing 10; bridge 13 provides a translucent star design 15 in a position to be illuminated by lamp 136.

Base portion 11 further provides lamp support ridge 56 behind rear shelf portion 38 and raised above it. A lamp support 58 in the form of a conductive strip is fastened to ridge 56, by staking, and six lamps 61, 62, 63, 64, 65 and 66 are carried in lamp support 58, each lamp being disposed above and in contact with a group of eight contacts in a contact array. Thus lamp 61 is in contact with portion 50 to which the contacts in group 114 are attached. Lamp support 58 is connected to plug 51. Each lamp is disposed to illuminate a translucent letter display slot from the rear; lamp 61 illuminates slot 23, and so on.

Control card 20 provides a leading edge 60, the edge that is first inserted into housing 10. Along edge 60 are provided a sequence of coded arrays 120, 122 and 124. (Only three coded arrays are provided on this particular card because only three letters are required to spell the word "DOG" designated by the picture; up to six arrays may be provided.) Each coded array comprises two or more apertures cut into edge 60; thus the array 120 corresponding to the letter "D" comprises apertures 68 and 70.

Each element card provides a leading edge, inserted first into a letter display slot, and provides a coded array of protrusions on the leading edge. Thus element card 30 provides on its leading edge 72 protrusions 74, 76 and 78 (FIG. 2). Each element card, when inserted in a letter display slot, corresponds in location to a contact array, a conductor, and a control card coded array.

Bridge 13 is so placed as to prevent the user's seeing the coded edges of either the control card or the element cards while they are in place.

A set of element cards may include cards each representing a particular letter of the alphabet, if the control card represents a word to be spelled, or may include cards representing numbers or other elements depending on the control card. Each element card representing a particular symbol is uniquely coded; that is, the protrusions on its leading edge are located in unique positions on each such card. Each array of apertures on a control card is also uniquely coded to represent a particular letter or other symbol. Thus if a control card array and an element card array are coincidently coded, the apertures and protrusions will coincide in location.

When a first correctly selected element card is placed in slot 23, group 116 of six contacts in contact array 102 becomes live. The insertion of a second correctly selected element card into slot 24, that is, a card whose array of protrusions is coded coincidently with array 122 of apertures on control card 20, will cause an electrical path to be completed through one contact in group 116, conductor 152, and one contact in group 142, which will cause lamp 62 to light.

A third correctly selected card will cause lamp 63 to be lit. Control card array 124, the third array, provides an additional aperture 144 in a position corresponding to contact 104-14, the fourteenth contact of contact array 104. Since all element cards, however coded, provide a protrusion corresponding in location to the fourteenth contact of an array, any element card may be the final card in a word, and activate the word lamp 136, if it is otherwise coincidently coded with the final control card array.

Protrusion 146 on card 34 forces contact 104-14 through aperture 144 into engagement with tab 131 of bus 130. A circuit is thus completed through word lamp 136, which illuminates the star design 15 in bridge 13. Lighting of this lamp indicates that a complete word has been correctly spelled, and serves as a reward to the user of the system.

I claim:

1. Card selection system for selecting at least one coded element card from a set of variously coded element cards, comprising a base having
  conducting means, and
  a plurality of resilient electrical contacts, movably positioned and biased with respect to said conducting means,
a control card and an element card each having visible indicia, one of said cards having a coded array of apertures, and the other having a coded array of cooperating protrusions,
said base receiving said one card with its said coded array of apertures aligned with said contacts and receiving said other card with its said coded array of protrusions directed toward said contacts, said protrusions moving certain of said contacts with respect to said conducting means, and said apertures cooperating to permit motion of said certain contacts with respect to said conducting means,
whereby a current is conditioned through said conducting means to indicate the selection of an element card having an array coincidently coded with a said control card coded array,
said element and control card visible indicia being spaced from one another for simultaneous display thereof.

2. Card selection system for selcting at least one coded element card from a set of variously coded element cards, comprising
a base having
  conducting means, and
  a plurality of resilient electrical contacts movably biased away from said conducting means,
a control card and an element card, each having visible indicia, one of said cards having a coded array of apertures, and the other having a coded array of cooperating protrusions,
said base receiving said one card with its said coded array of apertures aligned with said contacts and receiving said other card with its said coded array of protrusions directed toward said contacts, said protrusions directing certain of said contacts toward said conducting means, and said apertures cooperating to permit said certain contacts to engage said conducting means,
whereby a current is transmitted through said conducting means to indicate the selection of an element card having an array coincidently coded with said control card coded array,
said element card visible indicia and said control card visible indicia being spaced from one another for simultaneous display therof.

3. The system of claim 2, said conducting means comprising a plurality of conductors,
said plurality of resilient electrical contacts being disposed in a sequence of contact arrays, each said contact array corresponding with a said conductor,
said control card having a sequence of said coded arrays for selection of a sequence of said coded element cards, said control card being received in said base with its said sequence of coded arrays corresponding with said sequence of contact arrays.

4. The system of claim 3,
each said contact array comprising two groups of connected contacts, said two groups being insulated from each other,
each said contact array being connected to the next said contact array in said sequence,
said protrusions of a coincidently coded said one card directing at least one said resilient contact within each said group of a said contact array toward said corresponding conductor, and said apertures of said other card permitting said one contact within each said group to engage said corresponding conductor, for transmission of a current from one said group to the other.

5. The system of claim 3, wherein
said base provides contact spacing means for substantially preventing motion of said contacts parallel to said conductors while permitting flexion of said contacts to and from said conductors.

6. The system of claim 3, wherein
said sequence of contact arrays includes two initial contact arrays and further contact arrays, and
said conducting means further includes a bus, corresponding to said further contact arrays, said bus being insulated from said conductors, and said contacts being biased away from said bus,
one of said contacts in each said further contact array being disposed for engagement with said bus,
said one card being a said element card in said set, each said element card in said set having a protrusion array providing a protrusion directing said one contact toward said bus,
said other card being said control card,
said control card sequence including at least three said coded aperture arrays for determining the selection of a sequence of at least three coincidently coded said element cards, one of said coded aperture arrays being a final aperture array and providing an aperture permitting said one contact in the corresponding said contact array to engage said bus,
said base further providing signal indicating means connected to said bus and responsive to the selection of a completed sequence of said element cards each coincidently coded with a said control card aperture array including said final aperture array.

7. Card slection system for selecting at least one coded element card from a set of variously coded element cards, comprising
a base having
  conducting means, and
  a plurality of resilient electrical contacts movably biased away from said conducting means,
a set of element cards, and
a control card,
said control card having visible indicia and a sequence of coded arrays of apertures for selection of a sequence of said coded element cards,
each said element card having visible indicia, and a coded array of cooperating protrusions,
said conducting means comprising a plurality of conductors,
said plurality of resilient electrical contacts being disposed in a sequence of contact arrays, each said contact array corresponding with a said conductor.
each said contact array comprising two groups of connected contacts, said two groups being insulated from each other,
each said contact array being connected to the next said contact array in said sequence,
said base receiving said control card with its said sequence of coded arrays of apertures corresponding with said sequence of contact arrays, and receiving a said element card with its said coded array of protrusions directed toward said contacts, said protrusions of a coincidently coded said element card directing at least one said resilient contact within each said group of a said contact array toward said corresponding conductor, and said apertures of said control card permitting said one contact within each said group to engage said corresponding conductor, for transmission of a current from one said group to the other, said base providing contact spacing means for substantially preventing motion of said contacts parallel to said conductors while permitting flexion of said contacts to and from said conductors, said sequence of contact arrays including two initial contact arrays and further contact arrays, and said conducting means further including a bus, corresponding to said further contact arrays, said bus being insulated from said conductors, and said contacts being biased away from said bus, one of said contacts in each said further contact array being disposed for engagement with said bus, each said element card protrusion array providing a protrusion directing said one contact toward said bus, said control card sequence including at least three said coded aperture arrays for determining the selection of a sequence of at least three coincidently coded said element cards, one of said coded aperture arrays being a final aperture array and providing an aperture permitting said one contact in the corresponding said contact array to engage said bus, said base further providing signal indicating means connected to said bus and responsive to the selection of a completed sequence of said element cards each coincidently coded with a said control card aperture array including said final aperture array, whereby a current is transmitted through said conducting means to indicate the selection of a sequence of element cards having an array coincidently coded with a said control card coded array, said element card visible indicia and said control card visible indicia being spaced from one another for simultaneous display thereof.

* * * * *